US005820957A

United States Patent [19]
Schroeder et al.

[11] Patent Number: 5,820,957
[45] Date of Patent: Oct. 13, 1998

[54] ANTI-REFLECTIVE FILMS AND METHODS

[75] Inventors: Kristin M. Schroeder, Roseville; Brian L. Koster, Mendota Heights; Timothy T. Magill, Maplewood; Kenneth G. Olson, Woodbury, all of Minn.; Takashi Harada, Tokyo, Japan

[73] Assignee: Minnesota Mining and Manufacturing Company, St. Paul, Minn.

[21] Appl. No.: 646,709

[22] Filed: May 6, 1996

[51] Int. Cl.$^6$ ....................................................... B32B 3/00
[52] U.S. Cl. ........................ 428/40.1; 359/359; 359/588; 359/589; 428/40.2; 428/41.5; 428/41.7; 428/41.8; 428/42.1; 428/913
[58] Field of Search .................. 428/40.1, 40.2, 428/41.5, 41.7, 41.8, 42.1, 913; 359/359, 589, 588

[56] References Cited

U.S. PATENT DOCUMENTS

| | | | |
|---|---|---|---|
| Re. 34,605 | 5/1994 | Schrenk et al. | 359/359 |
| 3,213,753 | 10/1965 | Rogers | 359/497 |
| 3,610,729 | 10/1971 | Rogers | 350/157 |
| 3,661,686 | 5/1972 | Armstrong | 359/359 |
| 3,725,112 | 4/1973 | Hansen | 428/13 |
| 4,007,067 | 2/1977 | Dunning | 156/61 |
| 4,310,584 | 1/1982 | Cooper et al. | 428/212 |
| 4,376,147 | 3/1983 | Bryne et al. | 428/167 |
| 4,446,305 | 5/1984 | Rogers et al. | 528/348 |
| 4,463,045 | 7/1984 | Ahr et al. | 428/131 |
| 4,483,884 | 11/1984 | Troue | 427/54.1 |
| 4,525,413 | 6/1985 | Rogers et al. | 428/212 |
| 4,567,072 | 1/1986 | Brianard | 428/40.1 |
| 4,879,176 | 11/1989 | Ouderkirk et al. | 428/323 |
| 5,061,874 | 10/1991 | Hecq et al. | 313/478 |
| 5,103,337 | 4/1992 | Schrenk et al. | 359/359 |
| 5,122,905 | 6/1992 | Wheatley et al. | 359/586 |
| 5,157,526 | 10/1992 | Kondo et al. | 359/63 |
| 5,203,941 | 4/1993 | Spain et al. | 156/209 |
| 5,233,465 | 8/1993 | Wheatley et al. | 359/359 |
| 5,271,968 | 12/1993 | Coyle et al. | 427/558 |
| 5,382,463 | 1/1995 | Adkins et al. | 428/141 |
| 5,506,279 | 4/1996 | Babu et al. | 522/34 |

FOREIGN PATENT DOCUMENTS

| | | |
|---|---|---|
| 2077614 | 3/1993 | Canada . |
| 0 627 638 A1 | 12/1994 | European Pat. Off. . |
| 38 31 503 A | 3/1990 | Germany . |
| J5978285 | 5/1984 | Japan . |
| J01051932 | 2/1989 | Japan . |
| J01217402 | 8/1989 | Japan . |
| 0611932-A | 4/1994 | Japan . |
| 06234175-A | 8/1994 | Japan . |
| WO 95/17691 | 6/1995 | WIPO . |
| WO 95 31737 A | 11/1995 | WIPO . |
| WO 95/35515 | 12/1995 | WIPO . |

OTHER PUBLICATIONS

Database WPI Section Ch, Week 8847, Derwent Publications Ltd., London, GB; AN 88–335254 & JP 63 249 640 A, 17 Oct. 1988.
Patent Abstracts of Japan, vol. 095, No. 010, 30 Nov. 1995, and JP 07 181306A, Jul. 21, 1995.
Product Literature: Dupont Films, Charting The Future Of Films, "Type EB 48–500 Gauge", Printed Oct. 1995.
Product Literature: GE Plastics, Structured Products, LEXAN® High–Performance (HP) Films, Technical Guide, 1994.

*Primary Examiner*—Nasser Ahmad
*Attorney, Agent, or Firm*—Harold C. Knecht, III; Scott A. Bardell

[57] ABSTRACT

An anti-reflective film construction contains an optically transparent polymeric film having a textured surface and an optically transparent adhesive, the film construction configured to exhibit light transmission of greater than about 70 percent and 60° gloss measurement of between about 15 and 100. Methods of producing such film constructions and methods of reducing reflection from a surface are also described.

19 Claims, No Drawings

've,820,957

ANTI-REFLECTIVE FILMS AND METHODS

FIELD OF THE INVENTION

This invention relates to anti-reflective film constructions and further to an anti-reflective film construction containing an optically transparent polymeric film having a textured surface. The invention further relates to methods for producing such anti-reflective film constructions, and to methods of reducing reflection from a surface.

BACKGROUND OF THE INVENTION

There are numerous instances in which an optically transparent surface would be enhanced if the tendency of the surface to cause glare were reduced. Glare, or specular glare, is the undesirable reflection of light from a surface upon which the light is incident. The reduction of reflection is desirable in numerous settings, including in architectural and decorative glass, protective eyewear, computer monitor screens, and other display panels.

One example of an application in which reduced reflection would be desirable is in the automotive field, in which optically transparent surfaces are used in instrument clusters and other interior display components such as radios, clocks, and navigation systems. Currently, instrument clusters are protected from sunlight and other light sources by a brow or shroud, and lens covers are "raked" at a curve to focus unwanted first surface reflections away from the driver's view. It would thus be desirable to provide an anti-reflection material for application to such surfaces that would reduce the need for brows, shrouds, or the raking of lens covers.

Currently available anti-reflection coatings are expensive and do not meet durability requirements for automotive use. In one known method for addressing first surface reflections, small particles are deposited onto the surface to gradually change the refractive index and scatter light instead of directly reflecting it. These coatings are applied by dip-coating and are easily damaged by finger prints, dirt, or abrasive materials. In addition, they are expensive to apply. In a second known method, the surface of the material is textured to disrupt light reflections. It is difficult, however, to produce a consistent product with adequate transmission and clarity by texturing the surface during molding.

SUMMARY OF THE INVENTION

The present invention overcomes the disadvantages associated with known methods of reducing first surface reflection, and provides anti-reflective film constructions which may be applied to surfaces to reduce undesirable reflections from such surfaces. The anti-reflective film constructions of the present invention are highly suitable for use as an anti-reflective material in automotive applications, including instrument clusters and other interior display components, such as radios, clocks, and navigation systems, as well as many other applications in which a reduction of surface reflection from all viewing angles, without unacceptably compromising optical properties such as transmission, haze, and clarity, is desired.

Accordingly, in one aspect, the present invention features an anti-reflective film construction containing an optically transparent polymeric film having a textured surface, and an optically transparent adhesive. The film construction is configured to exhibit light transmission of greater than about 70 percent and a 60° gloss measurement of between about 15 and 100.

In a preferred embodiment, the film construction further contains an optically transparent polymeric support film disposed between the optically clear polymeric film and the adhesive. The film construction may also include a textured matte layer disposed against the textured surface of the optically transparent polymeric film. The anti-reflective film construction may also include a backing disposed against the optically transparent adhesive.

In preferred embodiments, the optically transparent polymeric film includes a polymerized acrylated urethane.

The anti-reflective film construction preferably is configured to exhibit a 60° gloss measurement of between about 50 and 100, and more preferably is configured to exhibit a 60° gloss measurement of between about 70 and 95. The film construction is preferably configured to exhibit haze of less than about 50 percent, and is preferably configured to exhibit clarity of greater than about 25 percent.

The optically transparent adhesive preferably is a pressure sensitive adhesive.

In another aspect, the present invention features a method of producing an anti-reflective film construction. The method involves the step of imparting a texture to the surface of an optically transparent polymeric film, where the polymeric film and the textured surface are selected to provide an anti-reflective film construction configured to exhibit light transmission of greater than about 80 percent and a 60° gloss measurement of between about 15 and 100.

In a preferred embodiment, the step of imparting a texture to the surface of an optically transparent film includes the steps of applying a polymerizable composition to a texturing surface, and curing the polymerizable composition to form an optically transparent film having a textured surface. The polymerizable composition preferably contains acrylated urethane monomers or oligomers. The texturing surface preferably is a matte liner having at least one major textured surface, and the polymerizable composition may be applied to the textured surface of the liner prior to curing.

The step of imparting texture to a surface of an optically transparent film may also include the steps of applying a polymerizable composition to a substrate, placing a texturing surface against the polymerizable composition, and curing the polymerizable composition to form an optically transparent film having a textured surface. The substrate may be an optically transparent polymeric support film. The method may further include the step of applying an optically transparent adhesive to a surface of the optically transparent polymeric film on a surface opposite the textured surface.

The method may further include the step of removing the textured surface following curing of the polymerizable composition.

The step of imparting a texture to the surface of an optically transparent film may alternatively include the steps of applying a composition containing a polymeric material and a solvent to a substrate, placing a texturing surface against the composition, and drying the composition.

In the method of the present invention, the film construction preferably is configured to exhibit a 60° gloss measurement of between about 50 and 100, and more preferably is configured to exhibit a 60° gloss measurement of between about 70 and 95. The anti-reflective film construction is preferably configured to exhibit haze of less than about 50 percent, and clarity of greater than about 25 percent.

In another aspect, the invention features an anti-reflective film construction containing an optically transparent polymeric film having a textured surface, wherein the film construction is configured to exhibit light transmission of greater than about 80 percent and a 60° gloss measurement of between about 15 and 100. The film construction may further include an optically transparent, pressure-sensitive adhesive on a surface opposite of the textured surface. In a preferred embodiment, the anti-reflective film construction further includes an optically transparent polymeric support film adjacent a surface opposite of the textured surface. Preferably, the anti-reflective film construction is configured to exhibit haze of less than about 50 percent.

In still another aspect, the invention features a method of reducing reflection from a surface. The method involves the step of applying an anti-reflective film construction in accordance with the present invention to the surface to thereby reduce undesirable surface reflection.

The invention thus provides an optically transparent, textured, anti-reflective polymeric film construction for application to lenses, display panels, or any material in which it is desirable to reduce first surface reflections while maintaining acceptable levels of light transmission, haze, and clarity. The anti-reflective film construction of the invention reduces specular glare when applied to the surface of such materials. The film constructions are thin, flexible, and provide scratch and solvent resistance. The film constructions do not compromise light transmission and provide a durable, optically transparent material for lamination to a variety of substrates.

DETAILED DESCRIPTION OF THE INVENTION

The invention provides an anti-reflective film construction containing an optically transparent polymeric film having a textured surface.

In accordance with the invention, the optically transparent polymeric film having a textured surface may be any polymeric material which is intrinsically capable of transmitting electromagnetic radiation in the wavelength range corresponding to visible light (approximately 3900–8000Å or 390–800 nanometers). Suitable polymeric materials include the non-crystallizing pure polymers or copolymers (sometimes referred to as "amorphous polymers"), which often allow high levels of light transmission and may thus be referred to as "transparent polymers." This class of polymers includes many styrenics (e.g., polystyrene), acrylics (e.g., polymethyl methylmethacrylate, copolymers of (meth) acrylic acid, or acrylic acid esters), cellulosics (e.g., cellulose acetate or cellulose acetate butyrate), the urethane acrylates, and blends or mixtures thereof. Other suitable polymers or copolymers in this class include engineering plastics, such as polycarbonate and polysufone, thermosets such as unsaturated polyester, epoxy and urethane resins, and unfilled, specially compounded elastomers, such as polyisoprene, fluoropolymers, silicone, and urethane, and blends or mixtures thereof.

Suitable polymeric materials also include the crystallizing polymers. The presence of crystalline regions in crystallizing polymers and copolymers tends to reduce the level of light transmission, but semi-crystalline polymers in moderate thickness are generally translucent, and films of many crystallizing polymers, particularly oriented films, can also be transparent. These include the olefins such as polyethylene and polypropylene, the polyamides such as PA-6 and PA6—6, and the thermoplastic polyesters such as polyethylene terephthalate (PET) and polybutylene terephthalate, and mixtures or blends thereof. Certain of the crystallizing polymers can be made into highly transparent films, such as PET and polymethylpentene.

In general, the transparency or translucency of polymeric materials is influenced by the size of the domains; transparency is lost when the average domain size is significantly larger than the wavelength of light.

An example of preferred optically transparent polymeric films for use in the present invention are films containing polymerized acrylated urethanes, and an especially preferred film contains the polymerization product of an acrylated urethane monomer/oligomer solution (CN964B85 from Sartomer, Exton Pa.), a multifunctional acrylate (hexanedioldiacrylate), an acrylate ester (2,2-ethoxy ethoxy ethyl acrylate) and a photoinitiator (benzil dimethyl ketal) (ESCACURE KB-1 from Sartomer). Another example of a preferred optically transparent polymeric film for use in the invention is an acrylic clear coat (e.g., V402, from Minnesota Mining and Manufacturing Co., St. Paul, Minn.), which may be applied in solvent and then dried to produce the film.

In general, it is desirable that the optically transparent polymeric material having a textured surface be abrasion resistant, scratch resistant, stable with respect to electromagnetic radiation, especially ultraviolet (UV) radiation (materials which discolor upon exposure to UV radiation being less desirable), dimensionally stable and durable over a temperature range of −40° C. to 120° C., and able to withstand high humidity conditions. It is also desirable that the polymeric material have a refractive index compatible with the substrate and with other layers or components of the anti-reflective film construction if such other layers or components are present. In general, the refractive index of the polymeric material should be close enough to the refractive index of the substrate material and other components of the anti-reflective film construction so as not to reduce specular light transmission below acceptable levels.

In addition, it is desirable that the optically transparent material having a textured surface have appropriate flexibility for the intended application. The contour of the substrate and the physical conditions to which the anti-reflective material is to be subjected, as well as other environmental factors, will determine the degree of flexibility (or rigidity) appropriate for the application.

The thickness of the optically transparent polymeric film having the textured surface may range from about 10 to about 750 micrometers, and preferably ranges from about 10 to about 250 micrometers.

The selection of a polymeric material from the wide variety of suitable materials for use as an optically transparent film having a textured surface will depend on the properties desired for the particular application, such as, for example, the index of refraction or flexibility of the material. These properties may be determined using methods known to those of skill in the art.

In accordance with the invention, the optically transparent polymeric film has a textured surface. The textured surface functions to diffuse incident light to a degree sufficient to reduce specular gloss without reducing transmission below acceptable levels. The optically transparent polymeric film is thus preferably formed from a material which may be placed against a texturing surface and then cured, dried, or hardened against the texturing surface to form the textured surface of the optically transparent polymeric film. For example, the optically transparent polymeric film may be formed from a polymerizable composition containing monomers and/or oligomers; alternatively, the film may be formed from a polymeric material which can be solvent-cast or can be extruded onto a surface to impart the desired texture.

The textured surface of the anti-reflective film may be imparted by any of numerous texturing materials, surfaces, or methods. Non-limiting examples of texturing materials or surfaces include: films or liners having a matte finish, microembossed films, a microreplicated tool containing a desirable texturing pattern or template, a sleeve or belt, rolls such as metal or rubber rolls, or rubber-coated rolls.

An example of a preferred texturing material is the textured surface of a film (MYLAR polyester, type 200XMEB31, 200 gage, available from DuPont Company). In a preferred embodiment of the invention, an anti-reflective film construction contains the polymerization product of a radiation-curable polymerizable composition wherein the polymerizable composition is placed against the textured surface of this polyester film before curing. Following cure, the polyester texturing material may be removed to provide an anti-reflective film construction containing an optically transparent polymeric film having a textured surface, ready for use. Advantageously, the texturing material may be retained on the textured surface of the anti-reflective film construction to protect the surface and may be removed at the time of use.

The anti-reflective film constructions of the present invention are configured, through selection of the optically transparent polymeric film and the textured surface of that film, to exhibit certain preferred optical properties. In accordance with the invention, the film constructions exhibit light transmission of greater than about 70 percent and a 60° gloss measurement of between about 20 and 100, preferably between about 50 and 100, and most preferably between about 70 and 95, as those parameters are described herein. Preferably, the anti-reflective film constructions of the invention are anti-reflective with respect to incident light at all viewing angles, and exhibit haze of less than about 50 percent, and clarity of greater than about 25 percent.

In preferred embodiments of the present invention, the anti-reflective film construction contains an optically transparent adhesive. In these embodiments, the optically transparent adhesive imparts to the anti-reflective film construction the capability of being applied to and adhered to a first surface of a substrate, such as a automotive lens or display panel. Any of the many known optically transparent adhesives are suitable for use in the anti-reflective film constructions of the invention, including silicone pressure sensitive adhesives and acrylate pressure sensitive adhesives. Suitable adhesives are preferably unfilled and stable with respect to ultraviolet light.

A particularly preferred class of optically transparent adhesives are the pressure-sensitive adhesives formed form ethylenically unsaturated free radically polymerizable monomers and/or oligomers.

Such polymers can be formed by polymerizing 50 to 100 parts by weight of one or more monomeric acrylic or methacrylic esters of non-tertiary alkyl alcohols, with the alkyl groups having from 1 to 20 carbon atoms (e.g., from 3 to 18 carbon atoms). Suitable acrylate monomers include methyl acrylate, ethyl acrylate, n-butyl acrylate, lauryl acrylate, 2-ethylhexyl acrylate, cyclohexyl acrylate, isooctyl acrylate, octadecyl acrylate, nonyl acrylate, decyl acrylate, and dodecyl acrylate. Also useful are aromatic acrylates, e.g., benzyl acrylate and cyclobenzyl acrylate.

Optionally, one or more monoethylenically unsaturated co-monomers may be polymerized with the acrylate monomers in amounts from about 0 to 50 parts co-monomer. One class of useful co-monomers includes those having a homopolymer glass transition temperature greater than the glass transition temperature of the acrylate homopolymer. Examples of suitable co-monomers falling within this class include acrylic acid, acrylamide, methacrylamide, substituted acrylamides such as N,N-dimethyl acrylamide, itaconic acid, methacrylic acid, acrylonitrile, isobornyl acrylate, methacrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth) acrylate, N,N-diethylacrylamide, beta-carboxyethyl acrylate, vinyl esters of neodecanoic, neononanoic, neopentanoic, 2-ethylhexanoic, or propionic acids (e.g., available from Union Carbide Corp. of Danbury, Conn. under the designation "Vynates"), vinylidene chloride, styrene, vinyl toluene, and alkyl vinyl ethers.

A second class of useful co-monomers includes those having a homopolymer glass transition temperature less than the glass transition temperature of the acrylate homopolymer. Examples of suitable co-monomers falling within this class include ethoxyethoxy ethyl acrylate (Tg=−71° C.) and methoxypolyethylene glycol 400 acrylate (Tg=−65° C.; available from Shin Nakamura Chemical Co., Ltd. under the designation "NK Ester AM-90G").

The adhesives may be prepared by any of numerous polymerization methods including radiation (e.g., UV or e-beam), solvent, bulk, emulsion, or suspension polymerization. The polymerized adhesives may be applied by polymerization on the film itself, by hot melt coating, or transfer-tape lamination. The optically transparent adhesive may also include a backing.

For polymerization by ultraviolet light, a preferred method, a photoinitiator is included. Useful photoinitiators include substituted acetophenones such as benzyl dimethyl ketal and 1-hydroxycyclohexyl phenyl ketone, substituted alpha-ketols such as 2-methyl-2-hydroxy-propiophenone, benzoin ethers such as benzoin methyl ether, benzoin isopropyl ether, substituted benzoin ethers such as anisoin methyl ether, aromatic sulfonyl chlorides, and photoactive oximes. The photoinitiator may be used in an amount from about 0.001 to about 5.0 parts by weight per 100 parts of total monomer, preferably from about 0.01 to about 5.0 parts by weight per 100 parts of total monomer, and more preferably in an amount from 0.1 to 0.5 parts by weight per 100 parts of total monomer.

In those embodiments of the invention in which the anti-reflective film construction contains an optically transparent adhesive, the adhesive typically is of a thickness of between about 25 to 125 micrometers. Thicker adhesives may be used, but may be less economical.

In other preferred embodiments of the invention, the anti-reflective film construction may include an optically transparent polymeric support film.

The optically transparent support film provides advantages in many applications of the present invention. For example, the presence of the polymeric support film improves the handling of anti-reflective film in terms of application to a substrate by reducing the tendency of the optically clear, textured polymeric film to stretch and providing ease of processing and ease of application to a substrate.

Typically, the polymeric support film is bonded to the optically transparent polymeric film on the surface of the optically transparent film opposite the textured surface of the film. In one embodiment, an optically transparent adhesive is applied to the polymeric support film on a surface of the polymeric support film opposite the surface to which the optically transparent polymeric film having a textured surface is bonded, such that the polymeric support film is disposed between the polymeric film having the textured surface, and the adhesive.

Polymeric materials suitable for use as the polymeric support film include those described above as suitable for the optically transparent polymer film having the textured surface. Examples of particularly preferred polymeric materials for the polymeric support film include polycarbonate, polymethyl methacrylate, polyester, styrene, styrene acrylonitrile, polyamides, polysufones, polypropylene, and cellulosic materials. The polymeric support film typically is of a thickness of between about 25 to 250 micrometers.

The invention also provides a method of producing an anti-reflective film construction.

The method involves the step of imparting a texture to the surface of an optically transparent film, where the polymeric film and the textured surface are selected to provide an anti-reflective film construction configured to exhibit light transmission of greater than about 70 percent and a 60° gloss measurement of between about 15 and 100.

The step of imparting the textured surface to the optically transparent film may be achieved by any of the methods described herein, including: applying a polymerizable composition to a texturing surface and curing the polymerizable composition; applying a polymerizable composition to a substrate, placing a texturing surface against the polymerizable composition, and curing the polymerizable composition; solvent casting a polymeric material onto a textured substrate and drying the polymeric material; or extrusion onto a surface to impart the desired texture.

The method for producing an anti-reflective film construction may also include providing an optically transparent adhesive on the film construction, as described above. The adhesive may be applied, for example, by polymerization on the film itself, by hot melt coating, or transfer-tape lamination.

The method may further involve providing an optically transparent polymeric support film in the film construction, as described above. The polymeric support film is disposed between the optically transparent polymeric film having a textured surface (and is bonded to a surface opposite the textured surface) and the optically transparent adhesive, and the adhesive is applied to the surface of the polymeric support film opposite the surface which is bonded to the optically transparent polymeric film having the textured surface.

Where a texturing substrate is used to impart the textured surface, such as a liner, film, or the like, the texturing substrate may be removed after the textured surface has been imparted; alternatively, the texturing substrate may be retained to provide protection to the film construction until it is used.

The invention may be illustrated by way of the following examples. All percentages used in the examples are weight percent unless otherwise specified.

EXAMPLE 1

A polymerizable composition was prepared by mixing in a pint jar 59.3% acrylated urethane monomer/oligomer solution (CN964B85 from Sartomer, Exton Pa.), 15.8% 1,6-hexanedioldiacrylate, 24.7% 2,2-ethyoxy ethyoxy ethyl acrylate and 0.2% benzil dimethyl ketal photoinitiator (ESCACURE KB-1 from Sartomer). The solution was mixed overnight on a roller mill, and then bar coated to a thickness of 0.003 inch (0.0762 mm) onto the textured surface of a polyester film (MYLAR polyester, type 200XMEB31, 200 gage, available from DuPont Company). The textured surface of the type 200XMEB31 MYLAR polyester film has a 20-degree (20°) gloss measurement of 13, a 60-degree (60°) gloss measurement of 60 (both measured using ASTM D523), and an Ra (roughness average) of 0.2 micrometer (measured by stylus profilometry method). A second polyester film having a silicone release surface was placed over the coating. The composite was cured under fluorescent ultraviolet lamps having an emission spectra between about 300 and 400 nm and a peak emission at 350 nm for 5 minutes. The total energy was 600 milliJoules/square centimeter. The silicone coated release film was removed from the cured film. An optically clear pressure-sensitive adhesive was prepared as described in U.S. Pat. No. 5,506,279, incorporated herein by reference. Briefly, an adhesive composition was prepared by mixing 83.80 parts isooctyl acrylate, 14.96 parts isobornyl acrylate, 1.00 part acrylic acid, 0.04 parts benzil dimethyl ketal photoinitiator, and exposing the mixture to ultraviolet lamps as described above. The syrup was then mixed with 0.20 part of the acryloamidoacetyl photoinitiator (compound No. 1 in Example 1 of U.S. Pat. No. 5,506,279). The syrup was then coated onto the cured urethane acrylate film to a thickness of 0.002 inch (0.0508 mm). A silicone coated polyester release liner (0.0508 nm) was applied to the coated composition. The coated adhesive composition was exposed to ultraviolet lamps (described above) for 5 minutes with a total energy of 665 milliJoules/square centimeter to produce a pressure sensitive adhesive between the cured film and the release liner. The polyester film was then removed, exposing a textured surface on the other side of the urethane acrylate film to produce a film construction. Thus, the textured surface of the urethane acrylate film had a texture that was the negative image of the textured surface of the polyester film.

A test composite was prepared by laminating the film construction to a 1.59 mm thick Plexiglas® brand acrylic panel measuring 70 mm by 280 mm (Acrylic Fabricators, Minneapolis, Minn.) using a rubber roller and taking care to avoid trapping air bubbles. The textured polyester film was then removed.

The composite was tested for light transmission, haze, and clarity using a "haze-gard plus" light meter from BYK-Gardner USA, Silver Spring, Md. using the methods described by the manufacturer. The device conforms to ASTM D-1033—Standard Test Method for Haze and Luminous Transmittance of Transparent Plastics and ASTM D-1044—Standard Test Method for Resistance of Transparent Plastics to Surface Abrasion.

The composite was tested for 60-degree (60°) gloss using a Glossmeter from Gardner Laboratory Inc., Bethesda, Md. The gloss test used was ASTM D523 60°.

The panel was then placed one meter away from an electroluminescent lamp (DUREL 3 Protolight, Product 334A White) using a 9 volt battery to measure the brightness of the electroluminescent lamp through the composite. Brightness was measured using a Minolta Luminance Meter, Model LS-100 from Minolta Corp. Ramsey, N.J. Readings were made in candles per square meter (cd/sq. m.)

Results for all of the tests are shown in Table 1.

EXAMPLE 2

Example 2 was prepared by coating an acrylic composition (V402 acrylic clear coat from Minnesota Mining & Manufacturing Co., St. Paul Minn.) onto the textured polyester film of Example 1 to a thickness of 0.076 mm wet and dried for 50 minutes at 66° C. to remove the solvent. Adhesive was coated as described in Example 1. A test composite was prepared and tested as in Example 1. Test results are shown in Table 1.

EXAMPLES 3 and 4

Example 3 was prepared as in Example 1 except that the polymerizable composition was coated onto a microembossed polypropylene film from 4P Floie, Forchheim, Germany.

Example 4 was prepared as in Example 1 except that the polymerizable composition was coated onto a polyester film (MELINEX 378 from ICI Films).

Composites were prepared and tested as in Example 1. Test Results are shown in Table 1.

EXAMPLES 5–6

Example 5 was prepared by coating the urethane acrylate composition onto a support film (0.076 mm thick LEXAN polycarbonate film, available from General Electric Co.). The textured surface of the polyester film was placed over the composition and the composition was cured under UV light as in Example 1.

The adhesive syrup composition of Example 1 was then coated onto the other surface of the support film and a silicone release liner was applied to the syrup and the composition was cured as in Example 1.

Example 6 was prepared as in Example 5 except a 0.13 mm thick clear polymethylmethacrylate film was used instead of the polycarbonate film.

Composites were then made and tested as in Example 1. Test results are shown in Table 1.

EXAMPLE 7

A urethane acrylate film was prepared as in Example 1 except that it was 0.13 mm thick. A composite was prepared and tested as in Example 1. Test results are shown in Table 1.

EXAMPLES C1–C2

Example C1 was plain Plexiglas® with no film and Example C2 is the electroluminescent lamp by itself.

TABLE 1

| Ex. | Transmission % | Haze % | Clarity % | 60° Gloss | Brightness cd/sq. m. |
|---|---|---|---|---|---|
| 1 | 93.1 | 10.4 | 74.6 | 80 | 9.18 |
| 2 | 93.0 | 11.5 | 74.2 | 79 | 8.73 |
| 3 | 93.4 | 7.9 | 50.6 | 63 | 9.50 |
| 4 | 92.1 | 42.2 | 28.7 | 18 | 8.95 |
| 5 | 92.8 | 9.2 | 78.4 | 92 | 8.7 |
| 6 | 93.2 | 9.4 | 76.0 | 88 | 8.71 |
| 7 | 93.2 | 9.8 | 75.6 | 81 | 8.98 |
| C1 | 93.5 | 0.4 | 99.9 | 154 | 8.65 |
| C2 | NT | NT | NT | NT | 8.68 |

NT—Not tested

The data in Table 1 show that the embodiments of the invention provide good light transmission while controlling the haze, clarity, and gloss. Additionally and surprisingly, the preferred embodiments show increased brightness which makes the lighted image behind the film more visible.

Other embodiments of the invention are within the scope of the appended claims.

What is claimed is:

1. An anti-reflective film construction comprising an optically transparent polymeric film having a textured surface and an optically transparent adhesive located on a surface opposite of said textured surface, said film construction configured to exhibit light transmission of greater than about 70 percent said textured surface having a texture that is the negative image of a texturing surface, said texturing surface having a texture defined by a 20° gloss measurement of 13, a 60° gloss measurement of 60, and a Ra of 0.2 micrometers.

2. The anti-reflective film construction of claim 1 further comprising an optically transparent polymeric support film disposed between said optically transparent polymeric film and said optically transparent adhesive.

3. The anti-reflective film construction of claim 1 further comprising a textured matte layer having said texturing surface releasably disposed against said textured surface of said optically transparent polymeric film.

4. The anti-reflective film construction of claim 1 further comprising a backing disposed against said optically transparent adhesive.

5. The anti-reflective film construction of claim 1 wherein said optically transparent polymeric film comprises a polymerized acrylated urethane.

6. The anti-reflective film construction of claim 1 wherein said film construction is configured to exhibit haze of less than about 50 percent.

7. The anti-reflective film construction of claim 1 wherein said film construction is configured to exhibit clarity of greater than about 25 percent.

8. The anti-reflective film construction of claim 1 wherein said optically transparent adhesive comprises a pressure-sensitive adhesive.

9. An anti-reflective film construction comprising an optically transparent polymeric coating having a textured surface, an optically transparent adhesive located on a surface opposite of said textured surface, and a polymeric support film, said polymeric support film disposed between said optically transparent polymeric coating and said optically transparent adhesive, said film construction configured to exhibit light transmission of greater than about 70 percent said textured surface having a texture that is the negative image of a texturing surface, said texturing surface having a texture defined by 20° gloss measurement of 13, a 60° gloss measurement of 60, and a Ra of 0.2 micrometers.

10. The anti-reflective film construction of claim 9 further comprising a textured matte layer having said texturing surface releasably disposed against said textured surface of said optically transparent polymeric film.

11. The anti-reflective film construction of claim 9 further comprising a backing disposed against said optically transparent adhesive.

12. The anti-reflective film construction of claim 9 wherein said optically transparent polymeric film comprises a polymerized acrylated urethane.

13. The anti-reflective film construction of claim 9 wherein said film construction is configured to exhibit haze of less than about 50 percent.

14. The anti-reflective film construction of claim 9 wherein said film construction is configured to exhibit clarity of greater than about 25 percent.

15. The anti-reflective film construction of claim 9 wherein said optically transparent adhesive comprises a pressure-sensitive adhesive.

16. An anti-reflective film construction comprising an optically transparent polymeric film having a textured surface, said film construction configured to exhibit light transmission of greater than about 70 percent said textured surface having a texture that is the negative image of a texturing surface, said texturing surface having a texture defined by a 20° gloss measurement of 13, a 60° gloss measurement of 60, and a Ra of 0.2 micrometers.

17. The anti-reflective film construction of claim 16 further comprising an optically transparent, pressure sensitive adhesive on a surface opposite of said textured surface.

18. The anti-reflective film construction of claim 16 further comprising an optically transparent polymeric support film adjacent a surface opposite of said textured surface.

19. The anti-reflective film construction of claim 16 wherein said film construction is configured to exhibit haze of less than about 50 percent.

* * * * *

UNITED STATES PATENT AND TRADEMARK OFFICE
CERTIFICATE OF CORRECTION

PATENT NO. : 5,820,957  
DATED : October 13, 1998  
INVENTOR(S) : Kristin M. Schroeder et al.

Page 1 of 1

It is certified that error appears in the above-identified patent and that said Letters Patent is hereby corrected as shown below:

<u>Column 10,</u>  
Line 2, kindly insert a comma after the word "percent".

Signed and Sealed this

Twenty-sixth Day of March, 2002

Attest:

Attesting Officer

JAMES E. ROGAN  
Director of the United States Patent and Trademark Office